US011539563B2

(12) United States Patent
Schreiber et al.

(10) Patent No.: US 11,539,563 B2
(45) Date of Patent: *Dec. 27, 2022

(54) METHOD, NETWORK NODE AND USER EQUIPMENT FOR PREAMBLE SEQUENCE TRANSMISSION AND RECEPTION TO CONTROL NETWORK TRAFFIC

(71) Applicant: Nokia of America Corporation, Murray Hill, NJ (US)

(72) Inventors: Gerhard Schreiber, Korntal-Muenchingen (DE); Marcos Tavares, Holmdel, NJ (US)

(73) Assignees: Alcatel Lucent, Boulogne-Billancourt (FR); Nokia of America Corporation, Murray Hill, NJ (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/165,278

(22) Filed: Feb. 2, 2021

(65) Prior Publication Data
US 2021/0160929 A1 May 27, 2021

Related U.S. Application Data

(62) Division of application No. 15/298,683, filed on Oct. 20, 2016, now Pat. No. 10,973,055.

(51) Int. Cl.
*H04W 74/08* (2009.01)
*H04B 7/08* (2006.01)
(Continued)

(52) U.S. Cl.
CPC ........ *H04L 27/2613* (2013.01); *H04B 7/0811* (2013.01); *H04W 74/0833* (2013.01);
(Continued)

(58) Field of Classification Search
CPC ......... H04W 74/0833; H04W 72/0413; H04W 72/02; H04W 72/04; H04W 74/004;
(Continued)

(56) References Cited

U.S. PATENT DOCUMENTS 8,085,724 B2   12/2011   Imamura et al.
8,477,698 B2    7/2013   Lee et al.
(Continued)

OTHER PUBLICATIONS

3GPP 38.913 v.0.3.1, "Study on Scenarios and Requirements for Next Generation Access Technologies" (Release 14, Jun. 2016).
(Continued)

*Primary Examiner* — Hoang-Chuong Q Vu
(74) *Attorney, Agent, or Firm* — Harness, Dickey & Pierce, P.L.C.

(57) ABSTRACT

The method includes receiving indicator information indicating a processor should use a first type preamble sequence or a second type preamble sequence to generate a first preamble sequence, generating the first preamble sequence, transmitting a first request message to request network resources, the first request message including the first preamble sequence, a processor being capable of generating both the first type preamble sequence and the second type preamble sequence for the first request message to initially request network resources, receiving a feedback message from the receiver, and controlling the network data traffic based on the feedback message. The second type preamble sequence has a higher robustness against frequency impairments compared to the first type preamble sequence. The second type preamble sequence is used in high carrier frequency scenarios, within 5G networks, in case of low-cost terminals, or in ultra-reliable and low latency communication (URLLC) use cases.

21 Claims, 11 Drawing Sheets

(51) Int. Cl.
*H04L 27/26* (2006.01)
*H04L 5/00* (2006.01)
*H04W 88/02* (2009.01)
*H04W 88/08* (2009.01)

(52) U.S. Cl.
CPC .......... *H04L 5/0051* (2013.01); *H04L 5/0091* (2013.01); *H04W 88/02* (2013.01); *H04W 88/08* (2013.01)

(58) Field of Classification Search
CPC . H04W 72/0406; H04W 88/02; H04W 88/08; H04B 7/0811; H04L 27/2613; H04L 5/0051; H04L 5/0091
See application file for complete search history.

(56) References Cited

U.S. PATENT DOCUMENTS

| | | | |
|---|---|---|---|
| 9,276,619 | B1 | 3/2016 | Intrater et al. |
| 9,331,883 | B1* | 5/2016 | Schelstraete ......... H04B 7/0452 |
| 2008/0045153 | A1* | 2/2008 | Surineni ............. H04B 7/0636 |
| | | | 455/63.1 |
| 2008/0240285 | A1 | 10/2008 | Han et al. |
| 2009/0041240 | A1 | 2/2009 | Parkvall et al. |
| 2009/0303907 | A1 | 12/2009 | Birru |
| 2010/0054235 | A1 | 3/2010 | Kwon et al. |
| 2011/0044244 | A1 | 2/2011 | Etemad |
| 2011/0158104 | A1 | 6/2011 | Frenger et al. |
| 2012/0224515 | A1 | 9/2012 | Nakayama et al. |
| 2014/0010214 | A1 | 1/2014 | Hooli et al. |
| 2014/0018082 | A1 | 1/2014 | Cheng et al. |
| 2014/0029602 | A1 | 1/2014 | Han et al. |
| 2015/0156760 | A1 | 6/2015 | Yu et al. |
| 2015/0365975 | A1 | 12/2015 | Sahlin et al. |
| 2015/0365977 | A1 | 12/2015 | Tabet et al. |
| 2016/0119811 | A1* | 4/2016 | Merlin ................. H04L 5/0055 |
| | | | 370/329 |
| 2016/0150541 | A1 | 5/2016 | Park et al. |
| 2016/0270058 | A1 | 9/2016 | Furuskog et al. |
| 2016/0359601 | A1* | 12/2016 | Xu ........................ H04L 5/0048 |
| 2017/0086228 | A1 | 3/2017 | Wu et al. |
| 2017/0257245 | A1 | 9/2017 | Shinagawa et al. |
| 2017/0303224 | A1 | 10/2017 | Choi et al. |
| 2018/0077730 | A1 | 3/2018 | Kim et al. |
| 2018/0092129 | A1 | 3/2018 | Guo et al. |
| 2018/0176065 | A1 | 6/2018 | Deng et al. |
| 2019/0174525 | A1 | 6/2019 | Kwak et al. |

OTHER PUBLICATIONS

Saur et al. "Radio Access Protocols and Preamble Design for Machine Type Communications in 5G," in Proc. Forty-Ninth Asilomar Conference on Signals, Systems and Computers, Pacific Grove, California, p. 8-12, Nov. 2015.
H. He et al., "Waveform Design for Active Sensing Systems," Cambridge University Press, 2012.
3GPP TS 36.211, "Physical channels and modulation", Release 10, Jan. 2011, 105 pages.
3GPP TS 36.331 "Evolved Universal Terrestrial Radio Access (E-UTRA); Radio Resource Control (RRC); Protocol specification", Release 13, Jan. 2016.
J. Vartiainen et. al., "False Alarm Rate Analysis of the FCME Algorithm in Cognitive Radio Applications," AICT 2015, the Eleventh Advanced International Conference on Telecommunications.
Nokia et al., "Cyclic delay-Doppler shifted M-Sequences for New Radio PRACH", 3GPP TSG-RAN WG1#86bis, R1-1609736, Lisbon, Portugal, Oct. 2016.
Lucent Technologies, "RACH in Support of High-Speed UEs" 3GPP TSG-RAN WG1 #46, R1-062387, Tallin, Estonia, Aug. 2006.
International Search Report and Written Opinion of the International Searching Authority dated Jan. 16, 2018 in PCT/US2017/056904.
International Preliminary Report on Patentability and Written Opinion dated Apr. 23, 2019 in corresponding PCT application PCT/US2017/056904.
Notice of Allowance dated Dec. 16, 2020, issued in corresponding U.S. Appl. No. 15/298,683.

* cited by examiner

METHOD, NETWORK NODE AND USER EQUIPMENT FOR PREAMBLE SEQUENCE TRANSMISSION AND RECEPTION TO CONTROL NETWORK TRAFFIC

CROSS-REFERENCE TO RELATED APPLICATION

This application is a divisional of U.S. application Ser. No. 15/298,683, filed on Oct. 20, 2016, the entire contents of which are hereby incorporated by reference.

BACKGROUND OF THE INVENTION

Field of the Invention

Example embodiments relate generally to a system and method for using preamble sequencing at a transmitter and receiver to control network traffic.

Related Art

FIG. 1 illustrates a conventional network 10. The network 10 includes an Internet Protocol (IP) Connectivity Access Network (IP-CAN) 100 and an IP Packet Data Network (IP-PDN) 1001. The IP-CAN 100 may include one or more evolved universal terrestrial radio access network (E-UTRAN) Node B (eNB) 105 (i.e., base station; for the purposes herein the terms base station and eNB may be used interchangeably). For simplicity sake, only one eNB 105 is shown in FIG. 1. The eNB 105 may be controlled by a controller (CO) 101, where the controller 101 may either exist within the eNB 105, or be a separate entity (i.e., node) from the eNB 105. The CO 101 may control the functions of multiple eNBs 105. Although not shown, the IP-PDN 1001 may include application or proxy servers, media servers, email servers, etc.

The eNB 105 is capable of providing wireless resources and radio coverage for one or more user equipments (UEs) 110. That is to say, any number of UEs 110 may be connected (or attached) to the eNB 105.

FIG. 2 illustrates a conventional E-UTRAN Node B (eNB) 105. The eNB 105 generally includes: a memory 225; a processor 210; a scheduler 215; wireless communication interfaces 220; radio link control (RLC) buffers 230 for each bearer; and a backhaul interface 235. The processor 210 may consist of one or more core processing units, either physically coupled together or distributed. The processor 210 can control the function of eNB 105 (as described herein), and is operatively coupled to the memory 225 and the communication interfaces 220. While only one processor 210 is shown in FIG. 2, it should be understood that multiple processors may be included in a typical eNB 105. The functions performed by the processor 210 may be implemented using hardware. Such hardware may include one or more Central Processing Units (CPUs), digital signal processors (DSPs), application-specific-integrated-circuits, field programmable gate arrays (FPGAs) computers or the like. The term processor, used throughout this document, may refer to any of these example implementations, though the term is not limited to these examples. With a Virtual Radio Access Network (VRAN) architecture various functions eNB components may be distributed across multiple processing circuits and multiple physical nodes within a VRAN cloud.

The eNB 105 may include one or more cells or sectors serving UEs 110 within individual geometric coverage sector areas. Each cell individually may contain elements depicted in FIG. 2. Throughout this document the terms eNB, cell or sector shall be used interchangeably.

Still referring to FIG. 2, the wireless communication interfaces 220 may include various interfaces including one or more transmitters/receivers connected to one or more antennas to transmit/receive wirelessly control and data signals to/from UEs 110. The backhaul interface 235 is the portion of eNB 105 that may interface with other eNBs, or interface with other network elements and/or RAN elements within IP-CAN 100. The scheduler 215 schedules control and data communications that are to be transmitted and received by the eNB 105 to and from UEs 110. The memory 225 may buffer and store data that may be processed at eNB 105, transmitted and received to and from eNB 105.

Scheduler 215 may make physical resource block (PRB) allocation decisions. The PRB allocations may be based upon a Quality of Service (QoS) Class Identifier (QCI), which represents traffic priority hierarchy, for instance.

A random access channel (RACH) may enable user equipments (UEs) 110 to perform tasks such as initially accessing the communication network 10, uplink synchronization, handovers between cells, and recovery from failed links. Therefore, an achievement of an optimal random access performance through an efficient RACH signature detection algorithm, and use of a correct configuration of the RACH parameters, is crucial to optimizing performance of the communication network.

FIG. 3 illustrates a conventional network controller 300. The controller 300 may include: a processor 302, a memory 304, a wireless interface 306 and a backhaul 308. The processor 302 of the controller 300 may control the function of multiple eNBs 105 within the IP-CAN 100 of the network 10.

FIG. 4 illustrates a conventional user equipment (UE) 100, which may be a mobile device. In particular, the UE 100 may be a cellphone, a laptop, a tablet, or any other type of user terminal device. The UE 100 may include: a processor 154, a memory 150 and a wireless interface 152.

Transmission of a random access (RA) preamble in an uplink transmission is one of the first steps of a UE 110 to obtain access to the network 10. Sets of signature sequences are ideally defined in order to display acceptable auto-correlation and low cross correlation, with a low susceptibility against impairments that originate in time and frequency domain to guarantee low false-alarm and miss-detection probabilities. To that end, Zadoff-Chu (ZC) sequences have conventionally been implemented for radio access as they are generally designed to show high robustness in time-dispersive channels. However, the ZC sequences can experience problems in channels that are simultaneously frequency-dispersive. Currently, in the context of 5G networks, there is a high demand to support data access for a large number of wireless devices (i.e., 1 million or more devices per square kilometer) within a single cell. Important key performance parameters include latency and latencies and reliability of these devices within the network 10. In radio communication systems, specific reference signal sequences are generally employed to enable reliable data transmission over the air interface. Reference signal sequences normally do not contain data, but are instead used to perform important tasks like an initial setup for radio access, channel estimation and/or channel quality assessment. Conventionally, industry standards define only one sequence design for a specific task, which is the Zadoff-Chu (ZC) sequences that may be employed for the physical random access channel (PRACH).

Additionally, in scenarios involving massive connectivity, mission critical applications and applications involving high Doppler shifts (where UEs 110 may be traveling at relatively high speeds, for example), legacy long-term evolution (LTE) PRACH configurations may not be capable of fulfilling all necessary performance requirements.

SUMMARY OF INVENTION

At least one example embodiment relates to a method of preamble transmission to control network data traffic in a communication network.

In one embodiment, the method includes generating, by at least one processor, a first preamble sequence, the at least one processor being capable of generating a first type of preamble sequence and a second type of preamble sequence; first transmitting, by the least one processor, a first request message to a receiver to request network resources, the first request message including the first preamble sequence which is one of the first type of preamble sequence and the second type of preamble sequence; and receiving, by the at least one processor, a feedback message from the receiver; and controlling, by the at least one processor, the network data traffic of the communication network based on the feedback message.

In one embodiment, the first request message includes a first set of data payload packets associated with the first request message, the controlling of the network data traffic further including, second transmitting a second set of data payload packets, using assigned network resources, following the reception of the feedback message, the feedback message identifying the assigned network resources.

In one embodiment, the first type of preamble sequence is a cyclic-shifted Zadoff-Chu (ZC) root sequence, and the second type of preamble sequence is a circular delay-Doppler shifted M-root sequence.

In one embodiment, the method further includes receiving, from the receiver, indicator information indicating that the at least one processor should use one of the first type of preamble sequence and the second type of preamble sequence in order to generate the first preamble sequence.

At least another example embodiment relates to a method of preamble detection to control network traffic in a communication network.

In one embodiment, the method includes receiving, by at least one processor, a signal from a transmitter, the signal including a first preamble sequence; detecting, by the at least one processor, the first preamble sequence within the first signal, the at least one processor being capable of detecting a first type of preamble sequence and a second type of preamble sequence; identifying, by the at least one processor, a first request message within the first signal based on the detected first preamble sequence; and controlling, by the at least one processor, the network data traffic of the communication network based on the identified first request message.

In one embodiment, the identifying of the first request message further includes identifying a first set of data payload packets within the first signal that is associated with the first request message, the controlling of the network data traffic further including, transmitting, to the transmitter, a feedback message, the feedback message identifying assigned network resources; and receiving, from the transmitter, a second set of data payload packets using the assigned network resources.

In one embodiment, the first type of preamble sequence is a cyclic-shifted Zadoff-Chu (ZC) root sequence, and the second type of preamble sequence is a circular delay-Doppler shifted M-root sequence.

In one embodiment, the detecting of the first preamble sequence includes using a serial processing detection including, removing a first cyclic prefix and a zero tail from the first signal to make a modified first signal, transforming the modified first signal in a first frequency domain signal, correlating the first frequency domain signal with a complex-conjugated, Fourier transformed root sequence to create a first inverse Fourier-transform, and performing serial detection of the first inverse Fourier-transform, using both a ZC root sequence detection and a M-root sequence detection in series, in order to detect the first preamble sequence.

In one embodiment, the detecting of the first preamble sequence includes using a parallel processing detection including, removing a first cyclic prefix and a zero tail from the first signal to make a modified first signal, transforming the modified first signal in a first frequency domain signal, correlating the first frequency domain signal with a complex-conjugated, Fourier transformed root sequence to create a first inverse Fourier-transform, performing parallel detection of the first inverse Fourier-transform, using both a ZC root sequence detection and a M-root sequence detection in parallel, in order to detect the first preamble sequence.

In one embodiment, the detecting of the first preamble sequence includes a processing detection in a time domain that is one of a serial processing detection and a parallel processing detection, the processing detection in the time domain including a direct correlation between the received signal and time domain reference sequences.

At least another example embodiment is related to at least a first network node in a communication network.

In one embodiment, the at least a first network node includes at least one processor, configured to, generate a first preamble sequence, the at least one processor being capable of generating a first type of preamble sequence and a second type of preamble sequence, transmit a first request message to a receiver to request network resources, the first request message including the first preamble sequence which is one of the first type of preamble sequence and the second type of preamble sequence, and receive a feedback message from the receiver, and control the network data traffic of the communication network based on the feedback message.

In one embodiment, the first request message includes a first set of data payload packets associated with the first request message, the at least one processor controlling the network data traffic by being further configured to, transmit a second set of data payload packets, using assigned network resources, following the reception of the feedback message, the feedback message identifying the assigned network resources.

In one embodiment, the first type of preamble sequence is a cyclic-shifted Zadoff-Chu (ZC) root sequence, and the second type of preamble sequence is a circular delay-Doppler shifted M-root sequence.

In one embodiment, the at least one processor is further configured to, receive, from the receiver, indicator information indicating that the at least one processor should use one of the first type of preamble sequence and the second type of preamble sequence in order to generate the first preamble sequence.

At least another example embodiment relates to at least a first network node in a communication network.

In one embodiment, the at least a first network node includes at least one processor, configured to, receive a signal from a transmitter, the signal including a first preamble sequence, detect the first preamble sequence within the first signal, the at least one processor being capable of detecting a first type of preamble sequence and a second type of preamble sequence, identify a first request message within the first signal based on the detected first preamble sequence, and control the network data traffic of the communication network based on the identified first request message.

In one embodiment, the at least one processor identifies the first request message by being further configured to identify a first set of data payload packets within the first signal that is associated with the first request message, and the at least one processor controls the network data traffic by being further configured to, transmit a feedback message, the feedback message identifying assigned network resources, and receive a second set of data payload packets using the assigned network resources.

In one embodiment, the first type of preamble sequence is a cyclic-shifted Zadoff-Chu (ZC) root sequence, and the second type of preamble sequence is a circular delay-Doppler shifted M-root sequence.

In one embodiment, the at least one processor detects the first preamble sequence by using a serial processing detection that includes the at least one processor being configured to, remove a first cyclic prefix and a zero tail from the first signal to make a modified first signal, transform the modified first signal in a first frequency domain signal, correlate the first frequency domain signal with a complex-conjugated, Fourier transformed root sequence to create a first inverse Fourier-transform, and perform serial detection of the first inverse Fourier-transform, using both a ZC root sequence detection and a M-root sequence detection in series, in order to detect the first preamble sequence.

In one embodiment, the at least one processor detects the first preamble sequence by using a parallel processing detection that includes the at least one processor being configured to, remove a first cyclic prefix and a zero tail from the first signal to make a modified first signal, transform the modified first signal in a first frequency domain signal, correlate the first frequency domain signal with a complex-conjugated, Fourier transformed root sequence to create a first inverse Fourier-transform, perform parallel detection of the first inverse Fourier-transform, using both a ZC root sequence detection and a M-root sequence detection in parallel, in order to detect the first preamble sequence.

In one embodiment, the at least one processor detects the first preamble sequence by being further configured to, perform a processing detection in a time domain that is one of a serial processing detection and a parallel processing detection, the processing detection in the time domain including a direct correlation between the received signal and time domain reference sequences.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
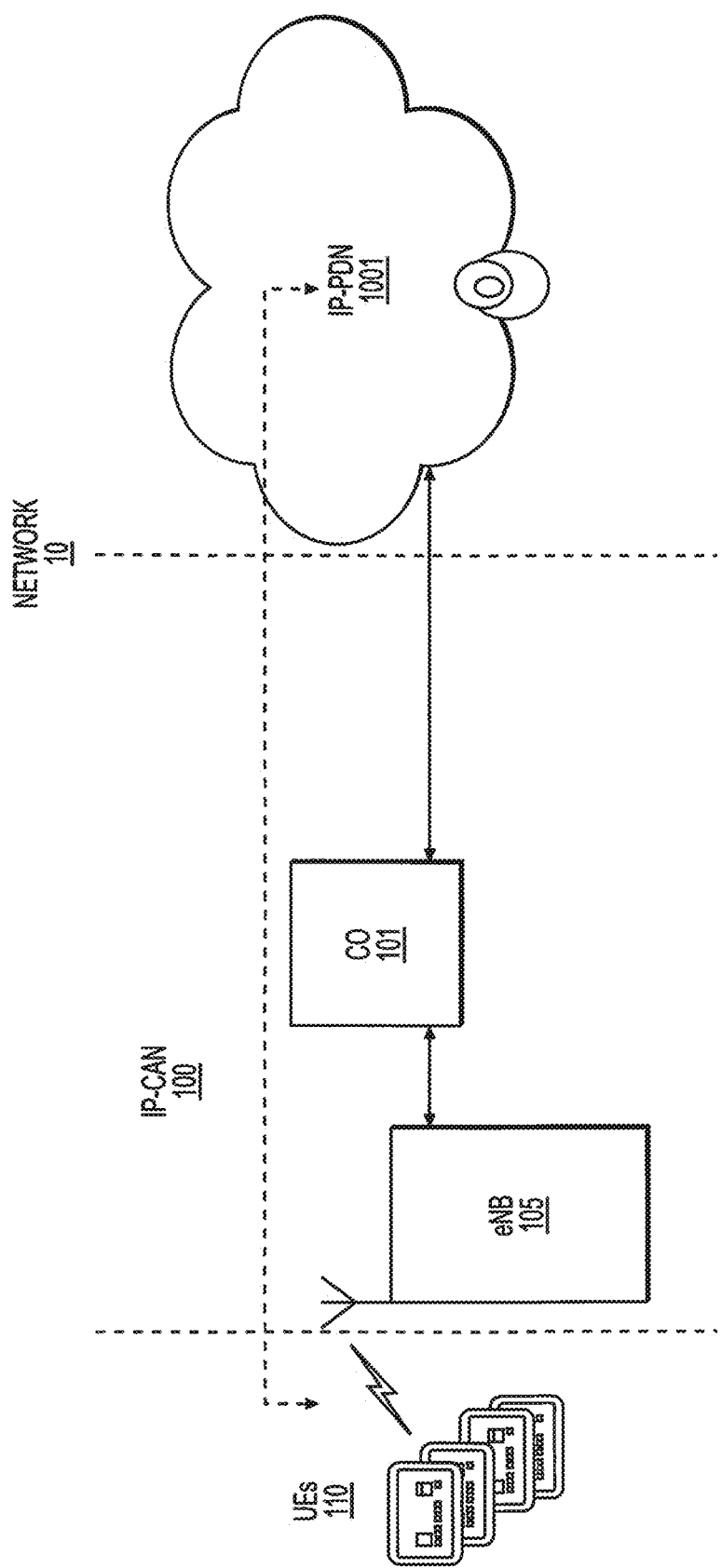
FIG. 1 illustrates a conventional network 10 with an Internet Protocol (IP) Connectivity Access Network (IP-CAN) and an IP Packet Data Network (IP-PDN)
Figure 2:
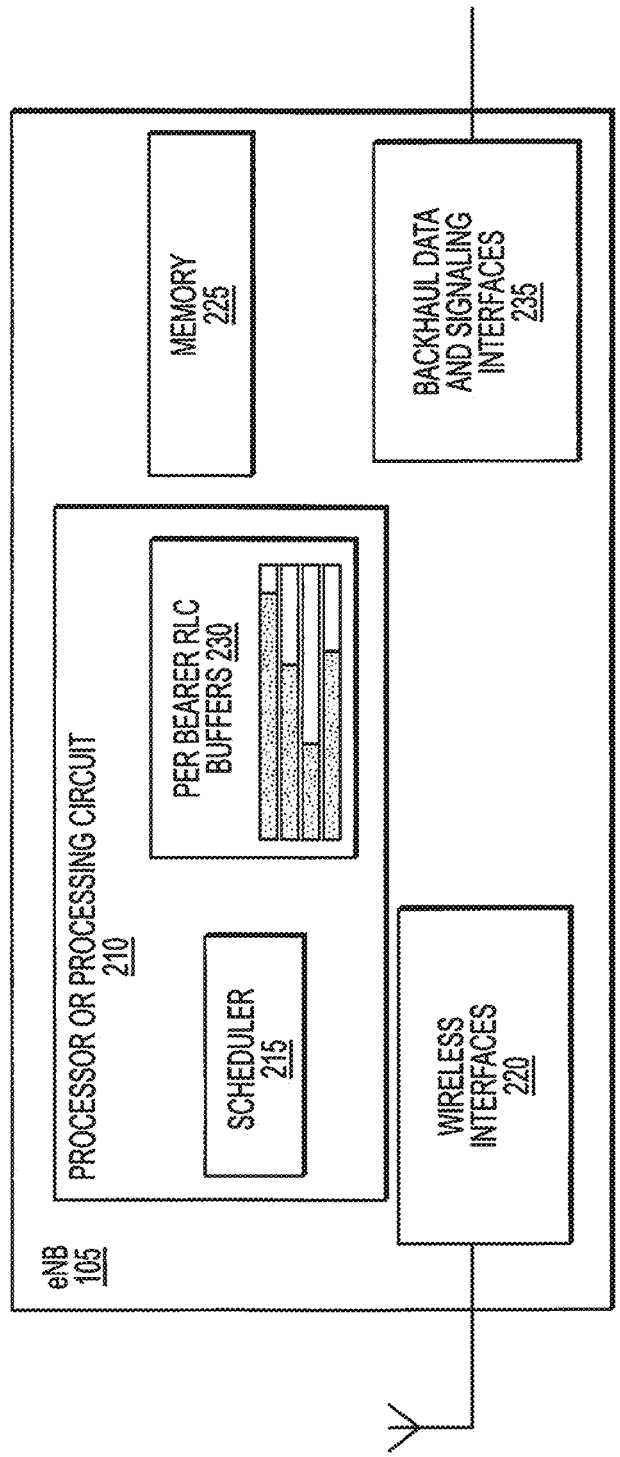
FIG. 2 illustrates a conventional E-UTRAN Node B (eNB)
Figure 3:
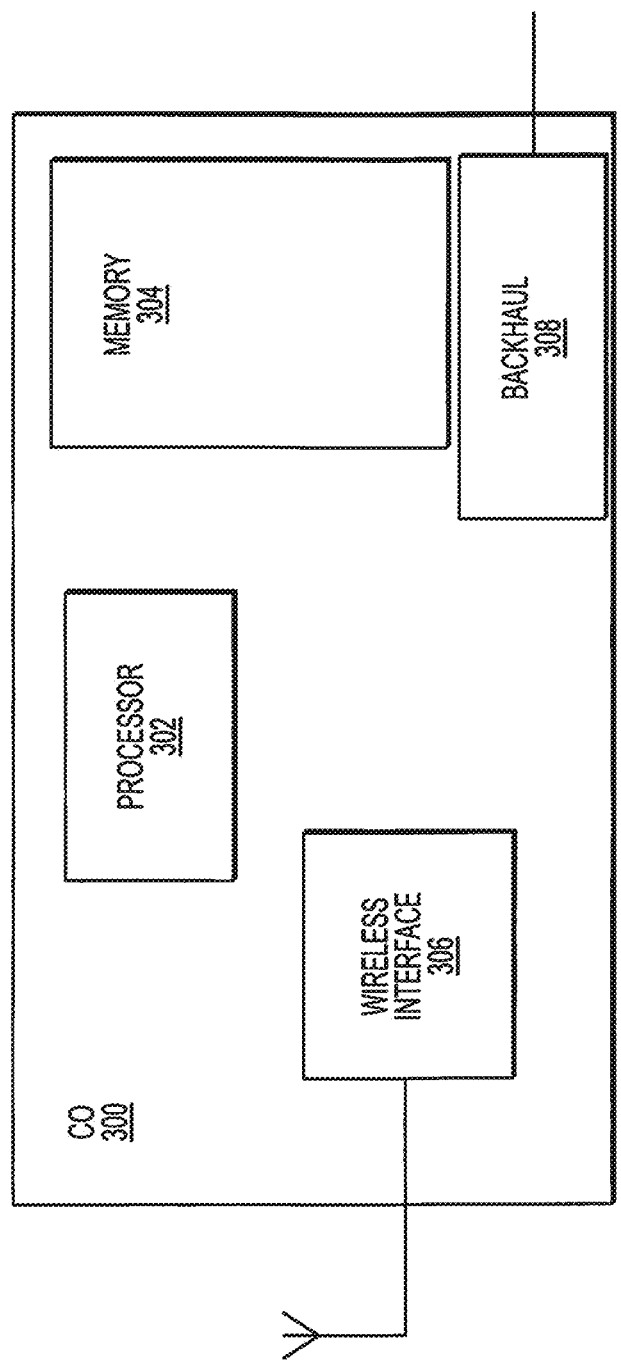
FIG. 3 illustrates a conventional network controller.
Figure 4:
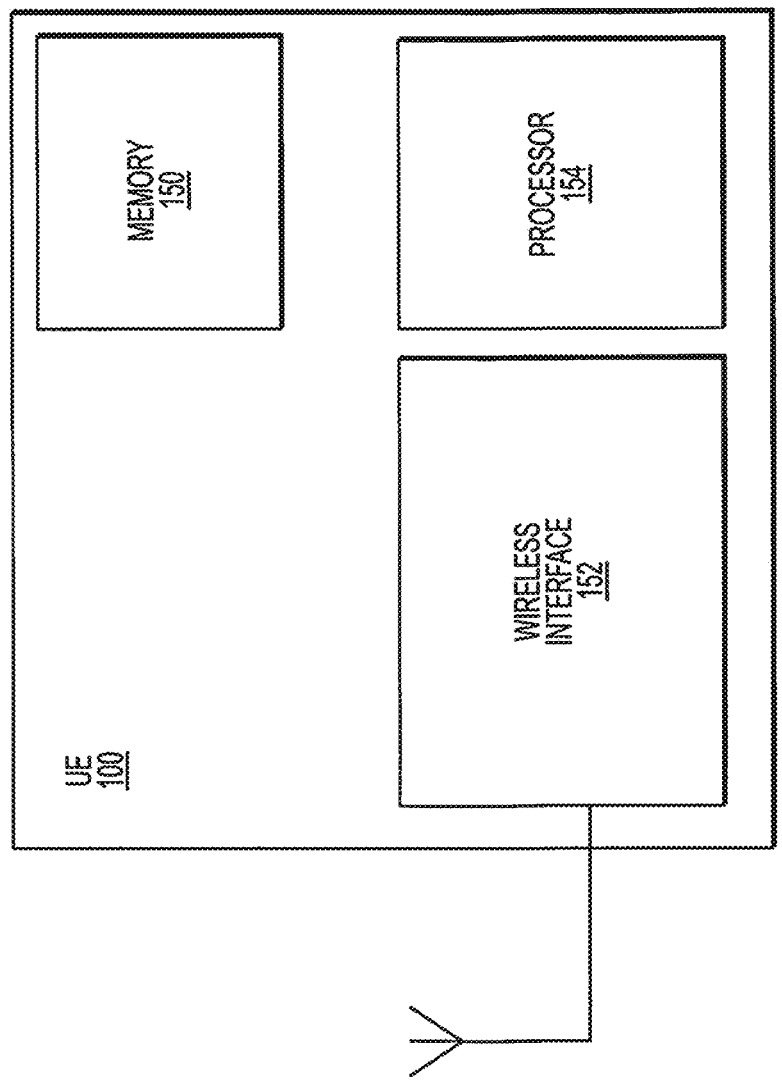
FIG. 4 illustrates a conventional user equipment (UE)

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, field programmable gate array (FPGAs), application specific integration circuit (ASICs), the program code or code segments to perform the necessary tasks may be stored in a machine or computer readable medium such as a storage medium, such as a non-transitory storage medium. A processor(s) may perform these necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Section 1—General Methodology:

It has been determined that the use of ZC-sequences may not be optimal for all network communications. For example, a drawback of ZC-sequences is a relatively high susceptibility against frequency impairments, such as oscillator center-frequency offsets (CFO) in a transmitter or receiver of the network 10, or mobility induced Doppler shifts (especially if UEs 110 are traveling at relatively moderate to higher speeds). Therefore, new sequences with higher robustness against frequency impairments may be beneficial in improving an overall system-performance of a network while allowing for the use of low-cost devices that may have relaxed oscillator requirements. M-sequences, with a circular delay-Doppler shift, may offer enhanced properties, especially with regard to center-frequency offsets (CFOs), and especially with regard to future radio systems such as 5G networks.

In particular, M-sequences may provide a higher resistance against frequency uncertainties, especially for applications in high-speed and high carrier-frequency scenarios, and within 5G networks. Specifically, M-sequences may be less susceptible to frequency uncertainties, as compared to legacy ZC-sequences. The use of M-sequences can especially be implemented in scenarios with higher UE 110 mobility, without a need to introduce restricted preamble sets, as required for ZC-sequences.

The use of new types of sequences may provide more reliable service for UEs 110 as compared to the use of legacy ZC-sequences, only. Low-cost terminals may cause a relative center-frequency offset, where an M-sequence may perform significantly better at an initial access rate, as compared to the ZC-sequences. Furthermore, M-sequences achieve very small minimum final NACK rates, even in presence of large frequency offsets. This property makes the use of M-sequences attractive for ultra-reliable and low-latency communication (URLLC) use cases.

It has been determined that the use of ZC- and M-sequences may coexist in the same time and frequency physical resources, where the system performance does not degrade in the presence of dual sequence (or, multi-sequence) types. A feature of a multi-sequence type system may be that the baseband processing may be accomplished without greatly disrupting legacy network systems. At a transmitter (UE 110) side, the device may be enabled to generate new preambles. Because preambles may be generated in a digital domain, it may be possible to cause the processor of the transmitter to be reconfigured to use multiple sequence types (such as ZC- and M-sequences). At the receiver (eNB 105) side, a controller of the eNB 105 may be reconfigured to perform correlations with both the legacy ZC-sequence, as well as the M-sequence. These correlations at the eNB 105 may either be performed in a parallel or serial arrangement. Therefore, the provisioning of additional sequences (such as M-sequences) for use in PRACH preamble generation may be greatly beneficial to improving the performance of expanding network systems.

The new sequences may be derived by circular delay-Doppler (time-frequency) shifts of m-sequences. These sequences show a higher robustness against frequency impairments, and a significantly reduced false-alarm probability, as compared to legacy ZC-sequences. In addition, more sequences may be uniquely detected at an eNB 105. Important key-performance metrics, such as protocol latencies, upload probabilities and/or cell-coverage, may therefore be significantly improved.

Section 2—Preamble Sequence Generation and Properties:

Section 2.1—Design of Zadoff-Chu Sequences

In an uplink random access preamble sequence, for use in a network such as a long-term evolution (LTE) network, the sequence may be generated from root Zadoff-Chu sequences, which may defined as follows.

$$x_u[n] = e^{-j\frac{\pi u n(n+1)}{N}}, 0 \leq n \leq N - 1 \quad \text{Equation 1}$$

A prime sequence length may be denoted as "N," and the physical root may be denoted as "u." For LTE, the sequence length N may be 839, and the physical root index may range from 1 to 838. Its value may depend on a broadcasted logical root sequence index and a mapping (that is defined by 3GPP TS 36.211, "Physical channels and modulation"). Usually, different physical root indices may be assigned to neighbor cells in order to guarantee low cross-correlations between preambles.

Different preamble sequences from one root sequence may be generated by applying cyclic shifts.

$$x_{u,v}[n] = x_u[(n+C_v) \bmod N] \quad \text{Equation 2}$$

Where the cyclic shift $C_v$ may be given by multiples of the distance $N_{CS}$ between two preambles.

$$C_v = \begin{cases} vN_{CS} & v = 0, 1, \ldots \left\lfloor \frac{N}{N_{CS}} \right\rfloor - 1, N_{CS} \neq 0 \\ 0 & N_{CS} = 0 \end{cases} \quad \text{Equation 3}$$

Section 2.2 Design of Circular Delay-Doppler Shifted m-Sequences

An m-sequence may be generated via linear-feedback shift registers. Sequences that originate from a $10^{th}$ order pseudo noise (pn) generator may be determined, where a generator polynomial may be defined as follows.

$$g(D) = D^{10} + D^9 + D^8 + D^5 + D^1 + 1 \quad \text{Equation 4}$$

An output of the generator may be a binary sequence b(n) of length 1023 that may be transformed into a BPSK (±1) modulated base sequence x[n]. Different base sequences may be generated by initializing the pn-generator with different values (e.g. from cell IDs). Alternatively, a cell-specific base offset may be introduced. From a base sequence, different preamble sequences may be derived by applying circular delay-Doppler shifts (as defined for instance by J. C., Guey "The design and detection of signature sequences in time-frequency selective channel," IEEE 19th International Symposium on Personal, Indoor and Mobile Radio Communications, 2008), as follows.

$$x_{u,v}[n] = x[(n - C_v) \bmod N] \cdot e^{j\frac{2\pi f u n}{N}}, 0 \leq n \leq N - 1 \quad \text{Equation 5}$$

Where $C_v$ may be the cyclic shift defined as an integer multiple of $N_{CS}$. Here, the $N_{CS}$ value may adjust the separability in time domain and should be therefore larger than the maximum expected delay spread. The phase signature parameter f may be selected larger than the maximum expected Doppler spread in the system. The cell ID may be used as a root index parameter u in order to guarantee that neighbor cells show different frequency shifts.

Section 2.3 Correlation Properties:

Ambiguity functions (AF) (as defined for instance by H. He et. al., "Waveform Design for Active Sensing Systems," Cambridge University Press, 2012) are well-known and often employed in radar technology to analyze an auto- and cross correlation of a reference signal with delay-Doppler ($\tau,v$) shifted versions of the same or a different signal. The periodic auto-ambiguity function (PAF) may be defined as follows.

$$\chi(\tau, v) = \frac{1}{T} \int_0^T u(t) \cdot u^*(t - \tau) e^{-j2\pi v(t-\tau)} dt$$

And the periodic cross-ambiguity function may be defined as follows.

$$\chi(\tau, v) = \frac{1}{T} \int_0^T u(t) \cdot w^*(t - \tau) e^{-j2\pi v(t-\tau)} dt$$

In a real-world system application, an absolute value of the ambiguity function may be considered as an output of a preamble correlator. That is to say, a correlation may be calculated for the AF between an unmodified expected signal and a signal that experienced delays due to multipath propagation and Doppler-effect induced frequency shifts due to the terminal's mobility or offsets in the transmitter's or receiver's oscillator. Therefore, the AF may be known to be a good measure to characterize a sequence's ability to be uniquely identified in a time-frequency dispersive channel.

Section 2.3.1—Ambiguity Function of Zadoff-Chu Sequences:

The PAF for a ZC sequence of length 31 is briefly discussed, herein. In the following we briefly discuss the PAF for a ZC sequence of length 31. In absence of a frequency shift v=0, a correlation is found to be a maximum at $\tau=0$ and zero for $\tau \neq 0$. This property had been a motivation to use Zadoff-Chu sequences as preamble sequence for the RACH. However, in the presence of frequency shift, this may no longer the case. Specifically, additional correlation peaks occur for specific frequency and time shifts. These self-images of the original transmitted sequence may result in detection errors at the receiver. For example: Assume that the sequence, transmitted with zero time-frequency shift, experiences a Doppler shift by v=+1 (corresponding to one subcarrier spacing), then the correlation based receiver may detect a sequence at around τ=10. The receiver will therefore wrongly interpret a detected sequence as one that has been transmitted with a cyclic time shift equivalent to τ=10. Actually, in this scenario there may be two errors. Firstly, the receiver may not able to detect the transmitted sequence (i.e., there may be a mis-detection event). Secondly, the receiver may observe a sequence that likely had not been transmitted by any terminal within the cell (i.e., there may be a false-alarm event). A collision may occur if a second terminal in the same cell transmits a preamble with a cyclic shift equal τ=10 without frequency uncertainty. A standardized method to resolve ambiguity is to introduce restricted sets (as defined in 3GPP TS 36.211, "Physical channels and modulation"). A drawback of this approach may be that a substantial number of preambles may not be available anymore.

Section 2.3.2—Ambiguity Function of Delay-Doppler Shifted M-Sequences:

In investigating an absolute value of the periodic auto-ambiguity function (PAF) as function of time-frequency shifted versions of a delay-Doppler shifted m-sequence, the relationship displays almost ideal correlation behavior. This means that it may be expected that false alarm errors may be substantially reduced. Additionally, significant increases in robustness against frequency impairments are also provided and more preambles may be used within a cell.

Section 2.4—Peak-to-Average Power Ratio (PAPR):

The peak-to-peak ratio (PAPR) for the M-sequences may be worse than for ZC-Sequences. For a sequence length around 1024, the difference may be about 3 dB.

Section 2.5—Baseband Signal Generation:

For both the ZC-sequences and the delay-Doppler shifted m-sequences, a baseband generation may follow procedures defined within LTE networks. Firstly, the sequence $x_{u,v}[n]$ may be transformed into a frequency domain via a N point DFT. The mapping onto the subcarriers and finally the signal in time domain may be generated via an IDFT.

Section 2.6—Receiver Design Considerations:

On a receiver side (eNB 105), a preamble correlation function may be extended to support a new sequence type (such as the m-sequence). Specifically, a newly introduced root sequence may be added to the ZC root sequences to be capable of determining sequences derived from multiple root sequences. Multi-root detection may be conducted in a parallel or serial arrangement (as described below in more detail), depending on the preamble detector design.

Section 3—Performance Assessment Via System-Simulations:

Section 3.1—Radio Access Protocol:

Simulations have been performed to assess a value of cyclic delay-Doppler shifted sequences for random access. Assumptions may be based on the standard 3GPP 38.913 v.0.3.1, "Study on Scenarios and Requirements for Next Generation Access Technologies" (Release 14, June 2016).

The uplink direction of a system may be dedicated to the transmission of IoT sensor or actuator traffic. 10 MHz of bandwidth may be assumed and a resource structure that may be equal to that of LTE (i.e. 50 Physical Resource Blocks (PRBs)) may each consist of 12 subcarriers and 14 OFDM symbols. Although 50 PRBs may be available, only 48 may be used for small packet access. Three OFDM symbols may be used for pilots and sounding leaving 11×12=132 resource elements per PRB for data.

A two-stage access with pooled resources (as described in Stephan Saur, Andreas Weber, and Gerhard Schreiber "Radio Access Protocols and Preamble Design for Machine Type Communications in 5G," in Proc. Forty-Ninth Asilomar Conference on Signals, Systems and Computers, Pacific Grove, Calif., p. 8-12, November 2015) may be selected as an access procedure. The PRBs in one subframe may be subdivided into a number of "short-packet blocks (SPBs)." One block may be dedicated to resource requests over PRACH, while six SPBs may be dedicated to data transmission. Due to the total number of 48 PRB used for small packet transmission, the data resources may have a size of 7 PRBs, while the request resource may have a size of 6 PRBs. A short packet may consist of 840 data bits. QPSK may be assumed for the modulation scheme, so that there is a code rate of 840/(11×12×7×2)=0.45 for the short packet transmission.

Figure 5:
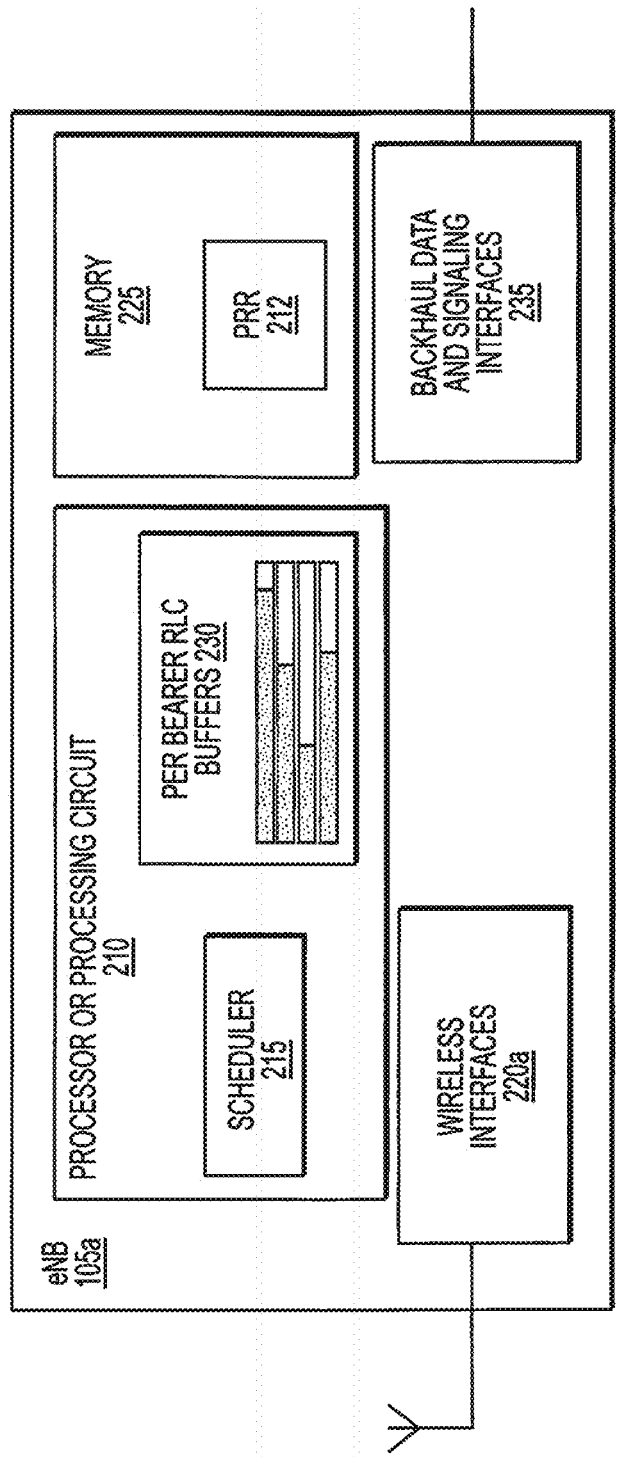
FIG. 5 illustrates a reconfigured E-UTRAN Node B (eNB), in accordance with an example embodiment.

Specific Implementation of an Example Method:

FIG. 5 illustrates a reconfigured E-UTRAN Node B (eNB) 105a, in accordance with an example embodiment. In particular, eNB 105 may be reconfigured to include a preamble reception routine (PRR) 212 that may be saved in memory 225. Specifically, the PRR 212 may provide instructions that may cause the processor 210 to perform some or all of the method steps that are described below in association with the method flowcharts depicted in FIGS. 9-11.

Figure 6:
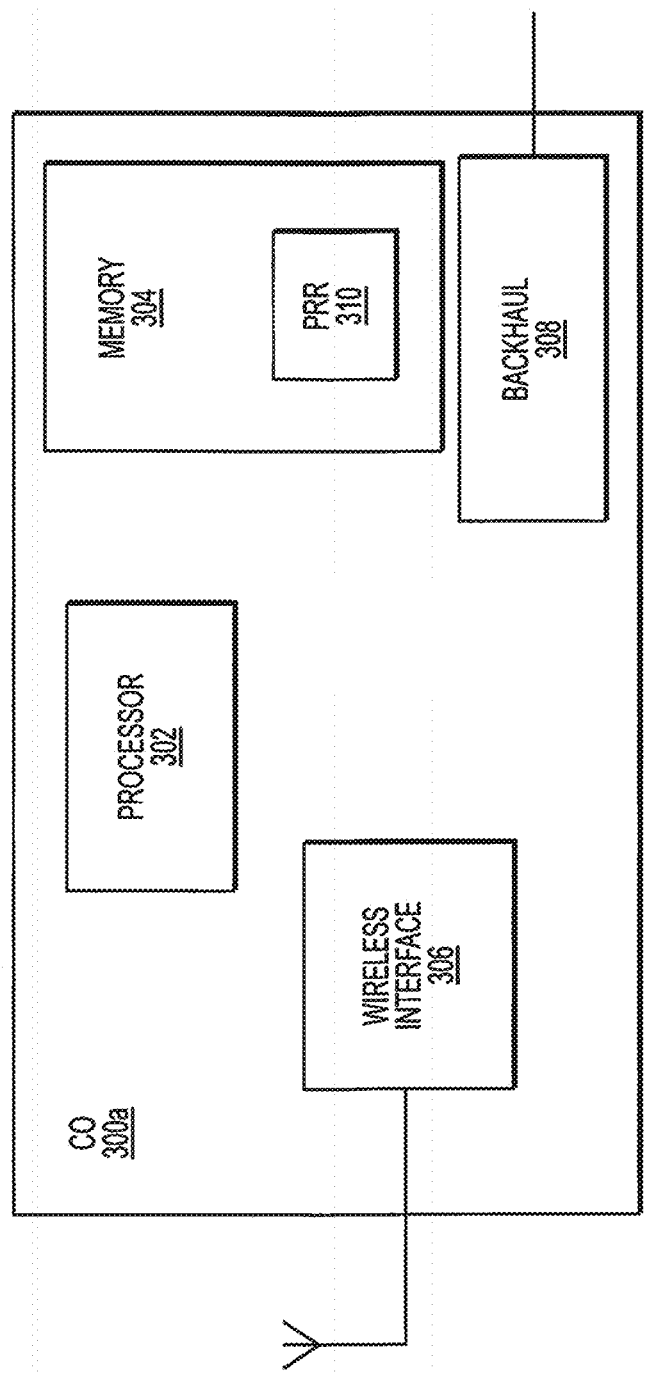
FIG. 6 illustrates a reconfigured network controller, in accordance with an example embodiment.

FIG. 6 illustrates a reconfigured network controller 300a, in accordance with an example embodiment. In particular, CO 300a may be reconfigured to include a preamble reception routine (PRR) 310 that may be saved in memory 304. Specifically, the PRR 310 may provide instructions that may cause the processor 302 of the CO 300a, and/or the processor 210 of the eNB 105a, to perform some or all of the method steps that are described below in association with the method flowcharts depicted in FIGS. 8-11. Specifically, the PRR 310 may provide instructions to either or both of the processors 210/302, in order to cause either the CO 300a, or the eNB 105a, or a combination of the CO 300a/eNB 105a to collectively perform the receiver-side method steps of FIGS. 9-11, as described below in more detail.

Figure 7:
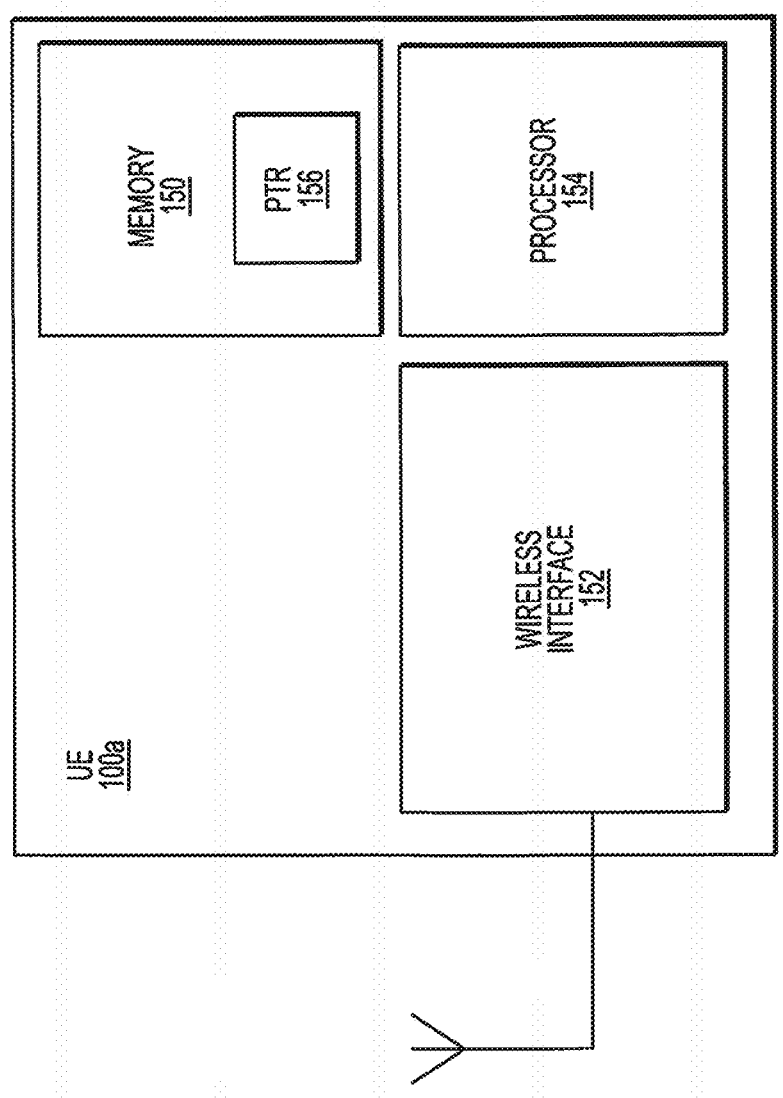
FIG. 7 illustrates a reconfigured UE, in accordance with an example embodiment.

FIG. 7 illustrates a reconfigured UE 100a, in accordance with an example embodiment. In particular, UE 100a may be reconfigured to include a preamble transmission routine (PTR) 156 that may be saved in memory 150. Specifically, the PTR 156 may provide instructions that may cause the processor 154 of the UE 100a to perform the transmitter-side method steps outlined in FIG. 8, as described below in more detail.

Figure 8:
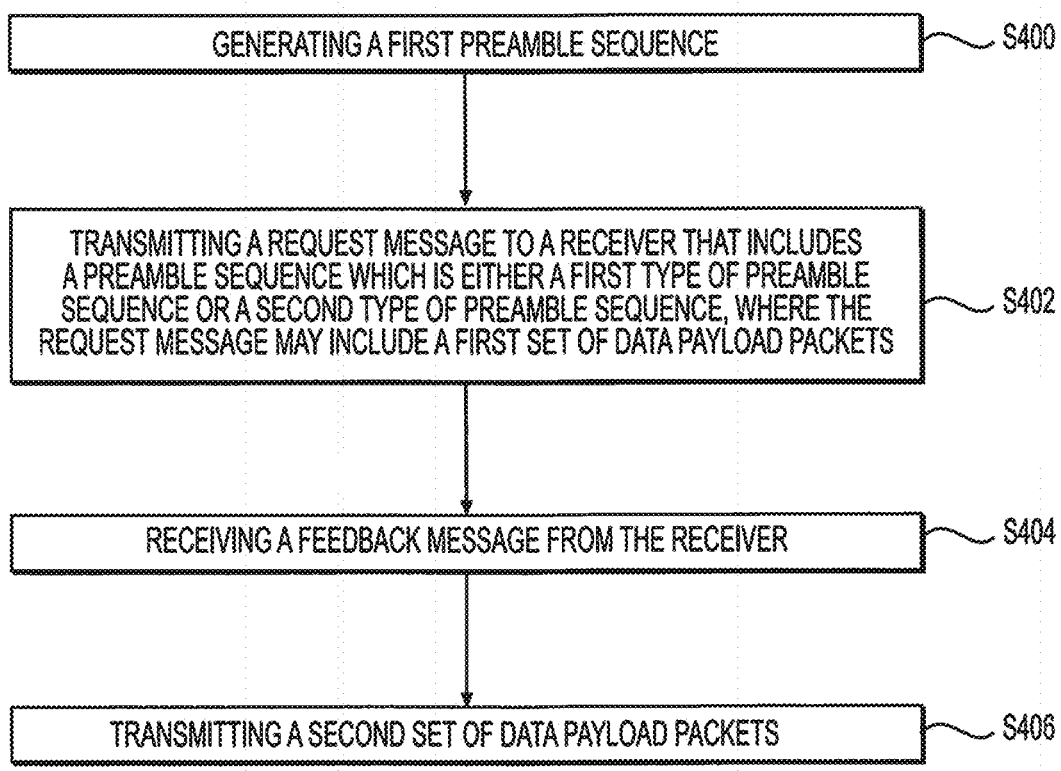
FIG. 8 illustrates a method of preamble transmission to control network traffic, in accordance with an example embodiment.

FIG. 8 illustrates a method of preamble transmission to control network traffic, in accordance with an example embodiment. The method steps may be accomplished by the processor 154 of UE 100a, where the PTR 156 provides the instructions for the processor 154 to perform these steps.

In step S400, the processor 154 may generate a preamble sequence to be sent in a signal to the eNB 105a. The generation of the preamble sequence may be accomplished unilaterally by the UE 100a, from the standpoint that the processor 154 may determine the sequence-type that is to be used to generate the sequence. Alternatively, the eNB 105a (or the CO 300a) may send indicator information to the UE 100a in order to instruct the processor 154 as to which sequence-type the processor 154 is to use to generate a preamble sequence. Specifically, the preamble sequence may be, for instance, either a ZC-sequence or a cyclic delay-Doppler shifted M-sequence (as an example).

Such indicator information may be part of information broadcasted by the eNB 105a to the UE 100a, e.g. via a Broadcast Control Channel (BCCH) in LTE. In case of a preamble sequence for use in PRACH, the indicator information may be defined in the information element PRACH-Config transmitted as part of System Information Block 2 in LTE (see 3GPP TS 36.331 "Evolved Universal Terrestrial Radio Access (E-UTRA); Radio Resource Control (RRC); Protocol specification"). In particular, the PRACH-ConfigSIB may be defined with an additional sequence capability parameter in the following way:

| PRACH-ConfigSIB ::= | SEQUENCE { |
|---|---|
| rootSequenceIndex | INTEGER (0..837), |
| prach-ConfigInfo | PRACH-ConfigInfo |
| prach-SequenceCapability | ENUMERATED (st1,st2,st3) |

The sequence capability parameter describes the basestation processing capabilities on PRACH. The mapping between the enumeration value and the capabilities may be implemented in different ways. For example, if one bit of information is employed, an enumeration value with value st1 could indicate that only ZC- (or legacy) preamble sequences may be processed by the base station. An enumeration value with value st2 could then indicate that the base station has the capability to process further (legacy plus advanced) preamble sequences, e.g. m-sequences. UEs with a capability to generate both legacy and advanced preamble sequences may then determine the sequence-type that is to be used to generate the sequence. Alternatively, if two bits of information are employed, a first enumeration value, (e.g. st1) could be used to indicate that the base station solely has the capability to process legacy sequences, e.g. ZC-sequences, a second enumeration value (e.g. st2) could be used to indicate that the base station solely has the capability to process advanced sequences, e.g. M-sequences, and a third enumeration value (e.g. st3) could be used to indicate that the base station has the capability to process both legacy and advanced sequences. It will be understood that the sequence capability parameter may not indicate the intrinsic capability of the base station, but instead may indicate the base station configuration in this regard. That is, if the base station is capable of handling both legacy and advanced sequences, but for some reason has chosen to process one type of preamble sequence, this choice may be reflected by the sequence capability parameter.

Alternatively, the indicator information in case of PRACH, could be part of the PRACH-ConfigInfo information structure. In yet another implementation, the indicator information in case of PRACH may be part of another PRACH-related information structure, for example RACH-ConfigCommon (see 3GPP TS 36.331 "Evolved Universal Terrestrial Radio Access (E-UTRA); Radio Resource Control (RRC); Protocol specification").

In step S402, the processor 154 may transmit a request message to the eNB 105a. The request message may include the preamble sequence. Specifically, the request message may include either the ZC-sequence, or a cyclic delay-Doppler shifted M-sequence (as an example), and the request message does not need to contain any further information about the requesting UE 100a. That is to say, the UE 110a may randomly choose one out of the offered preamble-types in the cell of the network 10. The request message may also include a first set of data payload packets that may be appended to the preamble sequence. Or, the first set of data payload packets may otherwise be transmitted in conjunction with the request message that include the preamble sequence.

In step S404, the processor 154 may receive a feedback message from the eNB 105a (or from the CO 300a). Specifically, after the UE 100a initially transmits the request message, the processor 154 may wait for a specified number of sub-frames for the feedback message to be received. The feedback message, e.g. similar or identical to a Random Access Response message received on a PDSCH or PDCCH channel in LTE (for instance), may contain information on available or attributed network resources (for instance, attributed physical resource blocks, modulation-and-coding scheme or random access preamble identifier) that the UE 100a may then use to send and receive data payload packets with the eNB 105a and/or CO 300a.

In step S406, the processor 154 may then cause the UE 100a to transmit at least a second set of data payload packets to the eNB 105a. Upon receiving an acknowledgement (ACK) signal from eNB 105a, the processor 154 will cease to attempt to re-send the second set of data payload packets. Otherwise, the processor 154 will continue to attempt to re-send the second set of data payload packets, until an ACK message is received from the eNB 105a or, alternatively, until a predetermined number of attempts has been reached. Upon receipt of a negative-acknowledgment (NACK), or upon exceeding the maximum number of re-send attempts, the processor 154 will, with a random backoff delay, reinitiate access with the eNB 105a (where the number of trials may be set to 4, for instance).

Figure 9:
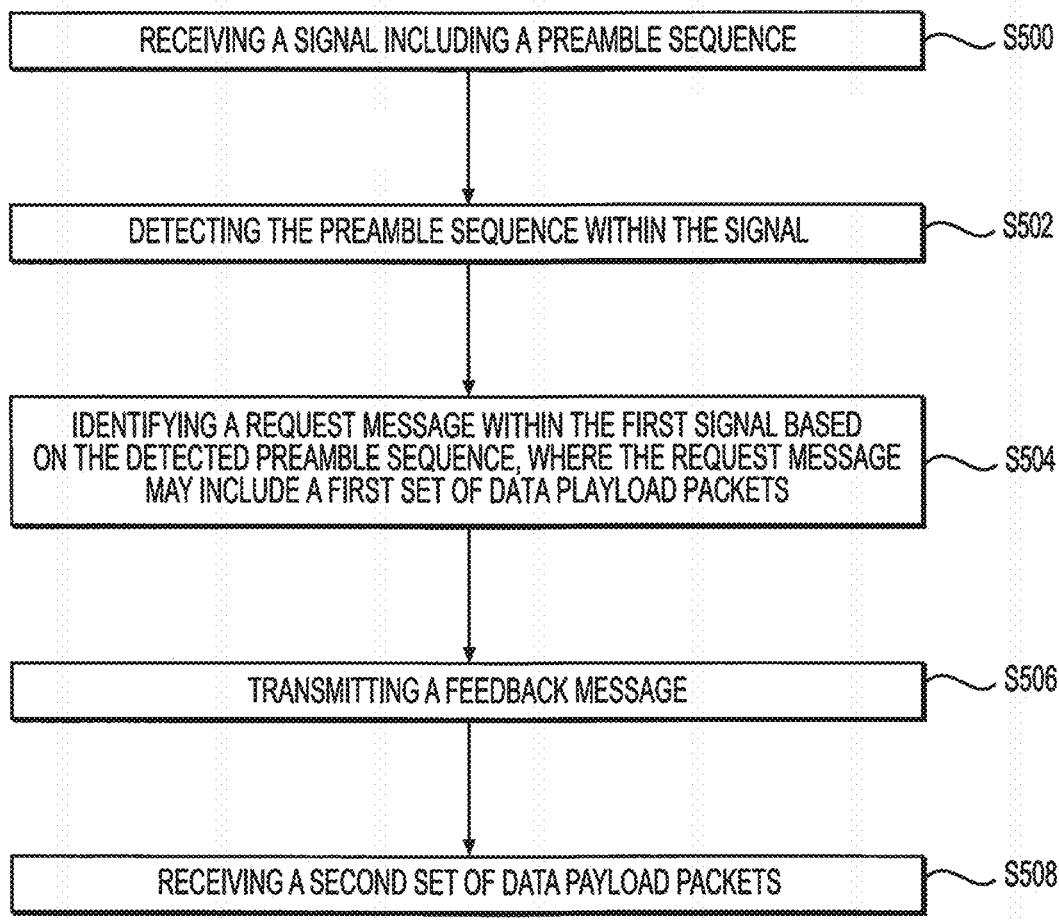
FIG. 9 illustrates a method of preamble detection to control network traffic, in accordance with an example embodiment.

FIG. 9 illustrates a method of preamble detection to control network traffic, in accordance with an example embodiment. The method steps may be accomplished by the processor 210 of eNB 105a, or processor 302 of CO 300a, or a combination of the processors 210/302, where the PRR 212 and/or PRR 310 may provide the instructions for the processors 210/302 to perform these steps. While the description (below) indicates that the processor 210 of the eNB 105a performs these steps, it should be understood that the processor 302 of the CO 300a may share some of the method step responsibilities.

In step S500, the processor 210 may receive a signal from the UE 100a. the signal may include a preamble sequence, where the preamble sequence may be one of a number of types of preamble sequences. Optionally, the processor 210 of the eNB 105a may initially command the UE 100a to use a particular type of preamble sequence, such that the eNB 105a (or the CO 300a) may dictate the preamble sequence-type. For PRACH this may be done in a way as described previously with reference to FIG. 8. Otherwise, the processor 154 of the UE 100a may unilaterally determine the sequence type.

In step S502, the processor 210 may detect the preamble sequence within the signal.

In step S502, the processor 210 may identify a request message within the first signal based on the detected preamble sequence. The request message may include a first set of data payload packets that may be appended to, or otherwise transmitted in conjunction with, the preamble sequence with the request message.

In step S506, the processor 210 may transmit a feedback message. The feedback message, e.g. similar or identical to a Random Access Response message transmitted on a PDSCH or PDCCH channel in LTE (for instance), may contain information on available or attributed network resources (for instance, attributed physical resource blocks, modulation-and-coding scheme or random access preamble identifier) that the UE 100*a* may then use to send and receive data payload packets with the eNB 105*a* (and/or CO 300*a*).

In step S508, the processor 210 may receive a second set of data payload packets from the UE 100*a*, in response to the feedback message. The processor 210 may then send an acknowledgement (ACK) to the UE 100*a*, acknowledging receipt of the second set of payload packets. Otherwise, in the event that the processor 210 does not receive a second set of data payload packets, the processor 210 may send a negative-acknowledgement (NACK) message to the UE 100*a*, indicating that payload packets were not received by the eNB 105*a* following the transmission of the feedback message.

Preamble Detection:

The processor 210 of the eNB 105*a* may be able to detect that a certain preamble is used, even in instances when the UE 100*a* unilaterally determines the preamble-type for the preamble sequence. A Forward Consecutive Mean Excision (FCME) algorithm may be used for the purpose of preamble signature detection (as disclosed in J. Vartiainen et. al., "False Alarm Rate Analysis of the FCME Algorithm in Cognitive Radio Applications," AICT 2015, the Eleventh Advanced International Conference on Telecommunications). However, the processor 210 of the eNB 105*a* may not be capable of detecting if there is a collision on the considered preamble (just as the processor 302 of the CO 300*a* would also be unable to provide such a detection of a collision).

It should be noted that resource requests may contain false-alarm requests. That is to say, it may be possible for physical resources to be attributed to a request, but there is not a UE 100*a* that will ultimately use the resources for data transmission (i.e., a false alarm might be a reason for resource blocking).

Figure 10:
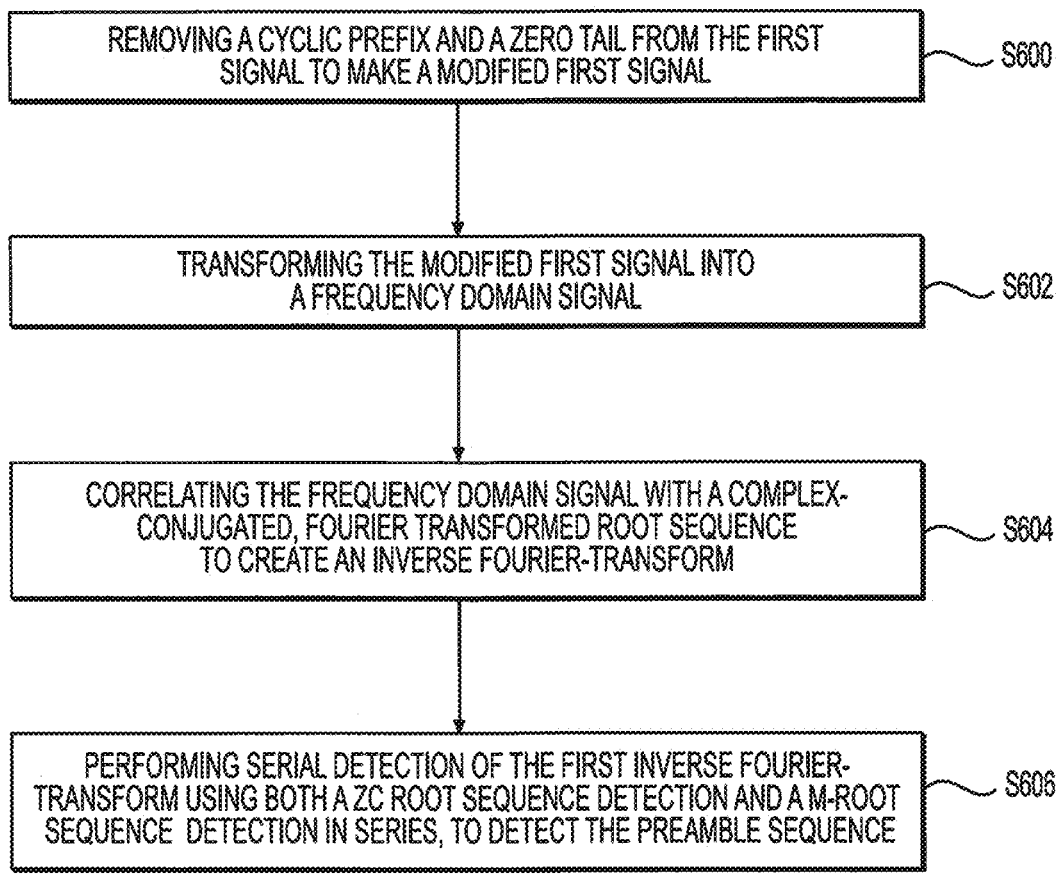
FIG. 10 illustrates a method of preamble detection involving a serial processing detection, in accordance with an example embodiment.

Preamble Detector Design:

FIG. 10 illustrates a method of preamble detection involving a serial processing detection, in accordance with an example embodiment. This scheme may allow for simultaneous detection of both ZC- and M-preamble sequences, that may be transmitted over the same time-frequency resources, where the detection may occur in a serial processing chain (whereas a parallel processing chain may alternatively be used instead, as described in relation to FIG. 11).

In a serial arrangement, detection of ZC and M-sequences may be performed by sharing a same processing resources in a time domain. That is to say, within one processing cycle, the sequences derived from one root sequence (either ZC or M-root sequence) may be detected. As shown in FIG. 10, in step S600, the processor 210 of the eNB 105*a* may first remove a cyclic prefix and a zero tail of the received digital signal from the UE 100*a*, in order to create a modified signal.

In step S602, the processor 210 may transform the modified signal, which is a time domain signal, in order to produce a frequency domain signal, e.g. by means of a Discrete Fourier Transform (DFT).

In step S604, the processor 210 may correlate the frequency domain signal, after subcarrier-demapping, using a complex-conjugated, Fourier transformed root-sequence, in order to create a Fourier-transformed signal.

In step S606, the processor 210 may use a subsequent inverse Fourier-transform to detect either ZC- or M-sequence type preamble sequences (where this detection is accomplished in series, starting with a first detection of a ZC-Sequence, followed secondly by a detection of an M-sequence or vice versa) in order to deliver a power-delay spectrum that is then input for the signature detection unit. Power-delay spectra from other antenna ports may be combined before signature detection. An advantage of a serial arrangement is that, only one processing chain may be required for preamble detection. A drawback of this serial detection approach (as compared to a parallel detection scheme, described in FIG. 11), is that it may result in an extra delay time.

Figure 11:
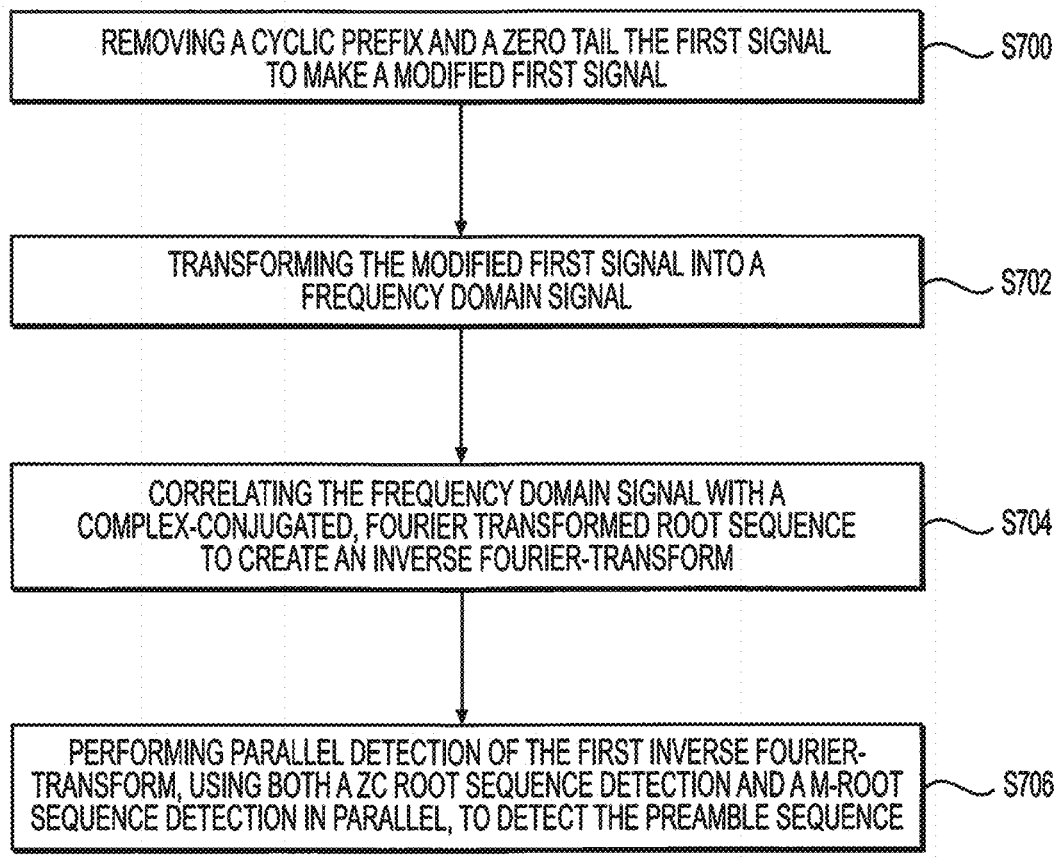
FIG. 11 illustrates a method of preamble detection involving a parallel processing detection, in accordance with an example embodiment.

FIG. 11 illustrates a method of preamble detection involving a parallel processing detection, in accordance with an example embodiment. In a parallel processing arrangement, detection of ZC and M-sequences may be performed by having redundant (i.e., dedicated) processing resources in a time domain, where each processing resource may individually detect one type of preamble sequence (such as ZC- and M-sequence type preambles). As shown in FIG. 11, in step S700, the processor 210 of the eNB 105*a* may first remove a cyclic prefix and a zero tail of the received digital signal from the UE 100*a*, in order to create a modified signal.

In step S702, the processor 210 may transform the modified signal, which is a time domain signal, in order to produce a frequency domain signal, e.g. by means of a Discrete Fourier Transform (DFT).

In step S704, the processor 210 may correlate the frequency domain signal, after subcarrier-demapping, using a complex-conjugated, Fourier transformed root-sequence, in order to create a Fourier-transformed signal.

In step S706, the processor 210 may use the subsequent inverse Fourier-transform to detect either ZC- or M-sequence type preamble sequences in order to deliver a power-delay spectrum that is then input for the signature detection unit, where the detection of the different types of sequences is each conducted at a same time (i.e., in parallel).

A potential disadvantage of a parallel scheme (as compared to a series scheme) is that this approach may have a somewhat higher implementation effort. An advantage of this scheme is that the scheme offers fewer delays than the serial detection.

Results:

In order to compare between conventional ZC-sequences, as compared to the use of M-sequences, investigations included the use of ZC sequences having a length of 1021. The M-sequences were used with a length of 1023. A transmission bandwidth was used over 6 PRBs in accordance to LTE. The following three metrics were investigated as key-performance metrics.

False alarm probability: A ratio between a total number of false alarms and a total number of possible transmitted preambles.

Final NACK probability: A ratio between a total number of UEs 100*a* that give up access or data transmission after the $4^{th}$ failed trial, and a total number of initial access attempts.

Delay: An average required time from initial access over PRACH until successful transmission of a data packet (metric includes all retrials).

Case 1: In a first implementation, a scenario with 64 preambles per cell was considered. The preambles were derived from one root sequence. Key performance indicators between ZC- and M-Sequences were compared as function of the initial access rate and center-frequency offset (CFO).

A false alarm rate was constantly small for the cyclic delay-Doppler shifted M-sequences. Even in the presence of significant center-frequency offsets, an observed error rate was significantly smaller than 1%. In contrast ZC-sequences show good false alarm rates only for the case without frequency offset. Typically, the new type of sequences showed a factor 10-100 smaller false alarm rates than traditional ZC-sequences. This behavior appeared to be a direct consequence of the improved correlation properties in the 2-dimensional time-frequency plane of M-sequences against ZC-sequences.

With regard to a final NACK rate, it was also assumed that a system target final NACK probability was set to 1%, and a relative center-frequency offset was set equal 0.25. The ZC-sequences were able to support a maximum initial access rate of 3500 attempts per second and sector. In contrast, the M-sequences allowed a maximum initial rate of up to 5100 attempts per second and sector. Based on this information, a maximum number of supported devices per area is approximately 4.8 Million devices/km$^2$ for the ZC-sequences, and 7.3 Million devices/km$^2$ for the M-sequence case. In this calculation, it was assumed that an initial access rate of 1 packet per 100s per device. The example embodiment preamble design may can offer service to significantly more UEs 100a, based on the trials. Specifically, with regard to the use of ultra-low cost transmitters with relaxed requirements on the oscillators, the trials of the example embodiments indicated superior performance over the use of ZC-sequence preambles, only.

With regard to protocol delay, in the presence of frequency impairments, it was observed for the ZC-sequence that a degradation of the protocol delays was experienced with an increase in initial access rate. In contrast, the use of the M-sequences does not cause delay degradation, even in presence of high frequency offsets.

Case 2: In a second investigation, a scenario was considered with different number of offered preambles in a cell. All preambles were derived from one root sequence. The relative center frequency offset was 0.25.

With regard to false alarm rates, it was observed that additional offered sequences increase a probability for false alarms, but this is much more relevant for ZC-sequences, as compared to M-sequences. For example, increasing a number of sequences from 64 to 128 increases a false alarm rate by about 0.1% when using M-sequence, whereas the alarm rate increased by about 2-3% when using the ZC-sequence.

With regard to a final NACK rate, it was assumed that a 1% target final NACK probability was desired. For the cyclic delay-Doppler shifted M-sequences, it was observed that a small improvement in the maximum number of served mobiles was experienced, if the number of offered preambles was increased from 64 to 128. In contrast for the ZC-sequence, it was observed that a significant reduction in a number of served mobiles occurred (i.e. from 3500 initial attempts per second to only 1000 initial attempts per second).

With regard to protocol delay, a delay degradation for the M-sequences was observed to be small, regardless of how many preambles that were offered in a cell. On the other hand, ZC-sequences show a strong increase in delay figures with an increasing number of offered preambles.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of preamble transmission to control network data traffic in a communication network, comprising:
receiving, by at least one processor of a user equipment from a receiver, indicator information indicating that the at least one processor should use one of a first type of preamble sequence or a second type of preamble sequence in order to generate a first preamble sequence;
generating, by the at least one processor, the first preamble sequence using the indicator information;
first transmitting, by the least one processor, a first request message to the receiver to initially request network resources, the first request message including the first preamble sequence, the at least one processor being capable of generating both the first type of preamble sequence and the second type of preamble sequence for the first request message for the first request message to initially request network resources; and
receiving, by the at least one processor, a feedback message from the receiver; and
controlling, by the at least one processor, the network data traffic of the communication network based on the feedback message, and
wherein the second type of preamble sequence has a higher robustness against frequency impairments compared to the first type of preamble sequence, and the second type of preamble sequence is used in at least one of high carrier frequency scenarios, within 5G networks, in case of low-cost terminals, or in ultra-reliable and low latency communication (URLLC) use cases.

2. The method of claim 1, wherein the first request message includes a first set of data payload packets associated with the first request message, the controlling of the network data traffic further including,
second transmitting a second set of data payload packets, using assigned network resources, following the reception of the feedback message, the feedback message identifying the assigned network resources.

3. The method of claim 1, wherein the first type of preamble sequence is a cyclic-shifted Zadoff-Chu (ZC) root sequence, and the second type of preamble sequence is a circular delay-Doppler shifted M-root sequence.

4. The method of claim 1, further comprising:
exchanging payload packets with the receiver using a selected preamble sequence type that was used for the first preamble sequence in the request message, the selected preamble sequence being the first type of preamble sequence or the second type of preamble sequence.

5. The method of claim 1, wherein the receiver is a base station.

6. The method of claim 1, further comprising:
receiving, from the receiver, in case of a preamble sequence for use in physical random access channel PRACH, PRACH-Config information, wherein the indicator information is defined in an information element of PRACH-Config.

7. The method of claim 6, further comprising:
receiving, from the receiver, said PRACH-Config information in System Information Block PRACH-ConfigSIB.

8. At least a first network node in a communication network, comprising:
at least one processor, configured to,
receive, from a receiver, indicator information indicating that the at least one processor should use one of a first type of preamble sequence or a second type of preamble sequence in order to generate a first preamble sequence,
generate the first preamble sequence, transmit a first request message to the receiver to request network resources, the first request message including the first preamble sequence, the at least one processor being capable of generating both the first type of preamble sequence and the second type of preamble sequence for the first request message for the first request message to initially request network resources, and receive a feedback message from the receiver, and control the network data traffic of the communication network based on the feedback message, and wherein the second type of preamble sequence has a higher robustness against frequency impairments compared to the first type of preamble sequence, and the second type of preamble sequence is used in at least one of high carrier frequency scenarios, within 5G networks, in case of low-cost terminals, or in ultra-reliable and low latency communication (URLLC) use cases.

9. The at least a first network node of claim 8, wherein the first request message includes a first set of data payload packets associated with the first request message, the at least one processor controlling the network data traffic by being further configured to, transmit a second set of data payload packets, using assigned network resources, following the reception of the feedback message, the feedback message identifying the assigned network resources.

10. The at least a first network node of claim 8, wherein the first type of preamble sequence is a cyclic-shifted Zadoff-Chu (ZC) root sequence, and the second type of preamble sequence is a circular delay-Doppler shifted M-root sequence.

11. The at least a first network node of claim 8, wherein the at least one processor is further configured to, exchange payload packets with the receiver using a selected preamble sequence type that was used for the first preamble sequence in the request message, the selected preamble sequence being the first type of preamble sequence or the second type of preamble sequence.

12. The at least a first network node of claim 8, wherein the receiver is a base station.

13. The at least a first network node of claim 8, wherein the at least one processor is further configured to:

receive, from the receiver, in case of a preamble sequence for use in physical random access channel PRACH, PRACH-Config information, wherein the indicator information is defined in an information element of PRACH-Config.

14. The at least a first network node of claim 13, wherein the at least one processor is further configured to:

receive, from the receiver, said PRACH-Config information in System Information Block PRACH-ConfigSIB.

15. A user equipment for a communication network, comprising:

at least one processor, configured to, receive, from a receiver, indicator information indicating that the at least one processor should use one of a first type of preamble sequence or a second type of preamble sequence in order to generate a first preamble sequence, generate the first preamble sequence, transmit a first request message to the receiver to request network resources, the first request message including the first preamble sequence, the at least one processor being capable of generating both the first type of preamble sequence and the second type of preamble sequence for the first request message for the first request message to initially request network resources, and receive a feedback message from the receiver, and control the network data traffic of the communication network based on the feedback message, and wherein the second type of preamble sequence has a higher robustness against frequency impairments compared to the first type of preamble sequence, and the second type of preamble sequence is used in at least one of high carrier frequency scenarios, within 5G networks, in case of low-cost terminals, or in ultra-reliable and low latency communication (URLLC) use cases.

16. The user equipment of claim 15, wherein the first request message includes a first set of data payload packets associated with the first request message, the at least one processor controlling the network data traffic by being further configured to, transmit a second set of data payload packets, using assigned network resources, following the reception of the feedback message, the feedback message identifying the assigned network resources.

17. The user equipment of claim 15, wherein the first type of preamble sequence is a cyclic-shifted Zadoff-Chu (ZC) root sequence, and the second type of preamble sequence is a circular delay-Doppler shifted M-root sequence.

18. The user equipment of claim 15, wherein the at least one processor is further configured to, exchange payload packets with the receiver using a selected preamble sequence type that was used for the first preamble sequence in the request message, the selected preamble sequence being the first type of preamble sequence or the second type of preamble sequence.

19. The user equipment of claim 15, wherein the receiver is a base station.

20. The user equipment of claim 15, wherein the at least one processor is further configured to:

receive, from the receiver, in case of a preamble sequence for use in physical random access channel PRACH, PRACH-Config information, wherein the indicator information is defined in an information element of PRACH-Config.

21. The user equipment of claim 20, wherein the at least one processor is further configured to:

receive, from the receiver, said PRACH-Config information in System Information Block PRACH-ConfigSIB.

* * * * *